(12) United States Patent
Yamanaka et al.

(10) Patent No.: US 6,642,694 B2
(45) Date of Patent: Nov. 4, 2003

(54) OVERCHARGE PROTECTION CIRCUIT CAPABLE OF PREVENTING DAMAGE TO A CHARGE CONTROL SWITCH ON FLOWING AN EXCESSIVE CURRENT

(75) Inventors: Yuji Yamanaka, Atsugi (JP); Kenichi Miki, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/056,879

(22) Filed: Jan. 24, 2002

(65) Prior Publication Data

US 2002/0121880 A1 Sep. 5, 2002

(30) Foreign Application Priority Data

Feb. 5, 2001 (JP) ........................................ 2001-028027

(51) Int. Cl.[7] ............................................. H01M 10/46
(52) U.S. Cl. ........................................ 320/134; 320/136
(58) Field of Search ................................ 320/124, 125, 320/127, 131, 132, 134, 135, 136

(56) References Cited

U.S. PATENT DOCUMENTS 4,315,364 A * 2/1982 Leffingwell
5,525,893 A * 6/1996 Alberkrack et al.
5,602,460 A * 2/1997 Fernandez et al.
5,892,351 A * 4/1999 Faulk

* cited by examiner

*Primary Examiner*—Edward H. Tso
(74) *Attorney, Agent, or Firm*—Frishauf, Holtz, Goodman & Chick, P.C.

(57) ABSTRACT

An overcharge protection circuit includes an overcharge detection section for detecting whether or not a secondary battery is put into an overcharge condition, and for producing an overcharge detected signal on detection of the overcharge condition. An overcharge blind time setting circuit produces, in response to the overcharge detected signal, an OFF control signal for turning a charge control switch off after a lapse of a predetermined overcharge detection blind time interval defined by a capacitance value of a capacitor. An excessive current detection resistor detects whether or not the charging current is an excessive current. When the excessive current is detected by the excessive current detection resistor, a forcibly discharged arrangement forcibly and immediately discharges electrical charges accumulated in the capacitor, thereby immediately turning the charge control switch off upon detection of the excessive current without waiting for the lapse of the predetermined overcharge detection blind time interval.

5 Claims, 6 Drawing Sheets

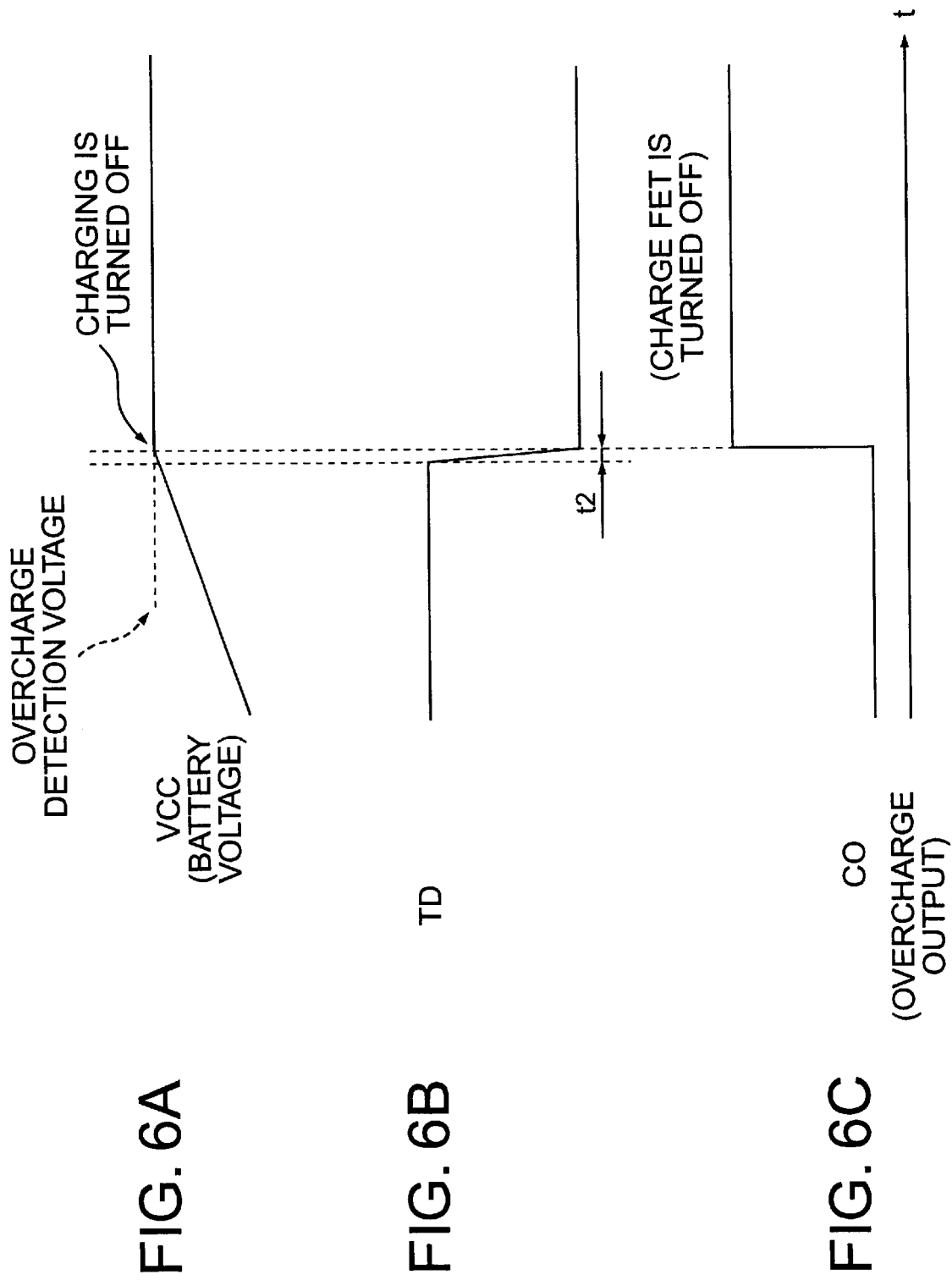

OVERCHARGE PROTECTION CIRCUIT CAPABLE OF PREVENTING DAMAGE TO A CHARGE CONTROL SWITCH ON FLOWING AN EXCESSIVE CURRENT

BACKGROUND OF THE INVENTION

This invention relates to a battery unit comprising a chargeable electric cell (secondary battery) such as a lithium ion cell and, in particular, to an overcharge protection circuit for protecting the secondary battery from overcharge.

Among various types of chargeable electric cells (secondary batteries), a lithium ion cell is particularly weak against overdischarge or overcharge. In this connection, it is essential to provide a battery protection circuit (battery protection integrated circuit (IC)) for detecting an overdischarge condition and an overcharge condition to protect a secondary battery from the overdischarge condition and the overcharge condition. For this purpose, the battery protection IC has two mechanisms (two functions): an overdischarge prevention mechanism (an overdischarge protection function) and an overcharge prevention mechanism (an overcharge protection function). In addition, the battery protection IC may detect an overcurrent condition during discharge of the secondary battery to protect the secondary cell from the overcurrent condition. In this event, the battery protection IC may have three mechanisms (three functions): an overcurrent prevention mechanism (an overcurrent protection function) as well as the overdischarge prevention mechanism (the overdischarge protection function) and the overcharge prevention mechanism (the overcharge protection function).

A battery unit comprising such as a battery protection IC is called a battery pack in the art. The battery pack has a pair of pack output terminals for selectively connecting a charger or a load therewith. In the pair of pack output terminals, one is a positive electrode terminal and another is a negative electrode terminal.

When the secondary battery is put into the overdischarge condition, it is necessary to stop a discharging operation and to connect the charger with the pack output terminals to charge the secondary battery. Generally, an overcharge protection circuit is for protecting a secondary battery by controlling, by turning a charge control switch on and off, a charging current flowing through the secondary battery from the charger. The secondary battery is connected between a power source terminal and a ground terminal.

In the manner which will later be described in conjunction with FIGS. 1–3, a conventional overcharge protection circuit comprises an overcharge detection section and an overcharge blind time setting circuit connected to the overcharge detection section. The overcharge detection section detects whether or not the secondary battery is put into an overcharge condition to produce an overcharge detected signal on detection of the overcharge condition. The overcharge blind time setting circuit has an overcharge blind time setting terminal and includes a capacitor connected between the overcharge detection blind time setting terminal and the ground terminal. Responsive to the overcharge detected signal, the overcharge blind time setting circuit produces an OFF control signal for turning the charge control switch off after a lapse of a predetermined overcharge detection blind time interval defined by a capacitance value of the capacitor.

In the manner which is described above, the conventional overcharge protection circuit monitors a battery voltage of the secondary battery and prohibits charging, when the battery voltage is equal to the overcharge detection voltage or more, by turning the charge control switch off after a lapse of the predetermined overcharge detection blind time interval set in the overcharge detection blind time setting terminal.

However, in a case where the charger is an abnormal one so as to flow, as the charging current, an excessive current (which has a current value, for example, of ten amperes or more), problem arises in the conventional overcharge protection circuit as follows.

More specifically, in this case, the battery voltage of the secondary battery becomes the overcharge detection voltage or more immediately after the secondary battery is charged by the charger. Nevertheless, in the conventional overcharge protection circuit, the excessive current continues to flow from the charger to the secondary battery during the overcharge detection blind time interval set in the overcharge detection blind time setting terminal. As a result, it is feared that the excessive current causes damage to the charge control switch and so on during the overcharge detection blind time interval.

SUMMARY OF THE INVENTION

It is therefore an object of the present invention to provide an overcharge protection circuit which is capable of preventing damage to a charge control switch when a charger is in an abnormal state and an excessive current is flowing as a charging current.

Other objects of this invention will become clear as the description proceeds.

On describing the gist of an aspect of this invention, it is possible to be understood that a method is for protecting a secondary battery by controlling, by turning a charge control switch on and off, a charging current flowing through the secondary battery from a charger.

According to the aspect of this invention, the above-mentioned method comprises the steps of detecting whether or not the charging current is an excessive current, and of immediately turning the charge control switch off when the charging current is the excessive current.

On describing the gist of another aspect of this invention, it is possible to be understood that a secondary battery protection circuit is for protecting a secondary battery by controlling, by turning a charge control switch on and off, a charging current flowing through the secondary battery from a charger.

According to the other aspect of this invention, the above-understood secondary battery protection circuit comprises a detecting arrangement for detecting whether or not the charging current is an excessive current. A switch off arrangement is for immediately turning the charge control switch off when the charging current is the excessive current.

On describing the gist of still another aspect of this invention, it is possible to be understood that an overcharge protection circuit is for protecting a secondary battery by controlling, by turning a charge control switch on and off, a charging current flowing through the secondary battery from a charger connected between a positive electrode terminal and a negative electrode terminal. The secondary battery is connected between a power source terminal and a ground terminal to generate a battery voltage.

According to still another aspect of this invention, the above-understood overcharge protection circuit comprises an overcharge detection section for detecting whether or not the second battery is put into an overcharge condition. The overcharge detection section produces an overcharge detected signal on detection of the overcharge condition. Connected to the overcharge detection section, an overcharge blind time setting circuit has an overcharge blind time setting terminal and includes a capacitor connected between the overcharge blind time setting terminal and the ground terminal. Responsive to the overcharge detected signal, the overcharge blind time setting circuit produces an OFF control signal for turning the charge control switch off after a lapse of a predetermined overcharge detection blind time interval defined by a capacitance value of the capacitor. An excessive current detecting arrangement detects whether or not the charging current is an excessive current. A forcibly discharging arrangement forcibly and immediately discharges electrical charges accumulated in the capacitor when the excessive current is detected by the excessive current detecting arrangement, thereby immediately turning the charge control switch off upon detection of the excessive current without waiting for the lapse of the predetermined overcharge detection blind time interval.

BRIEF DESCRIPTION OF THE DRAWING

FIGS. 6A–6C are time charts for use in describing operation of the overcharge protection circuit (the battery pack) illustrated in FIG. 5.

DESCRIPTION OF THE PREFERRED EMBODIMENTS

Figure 1:
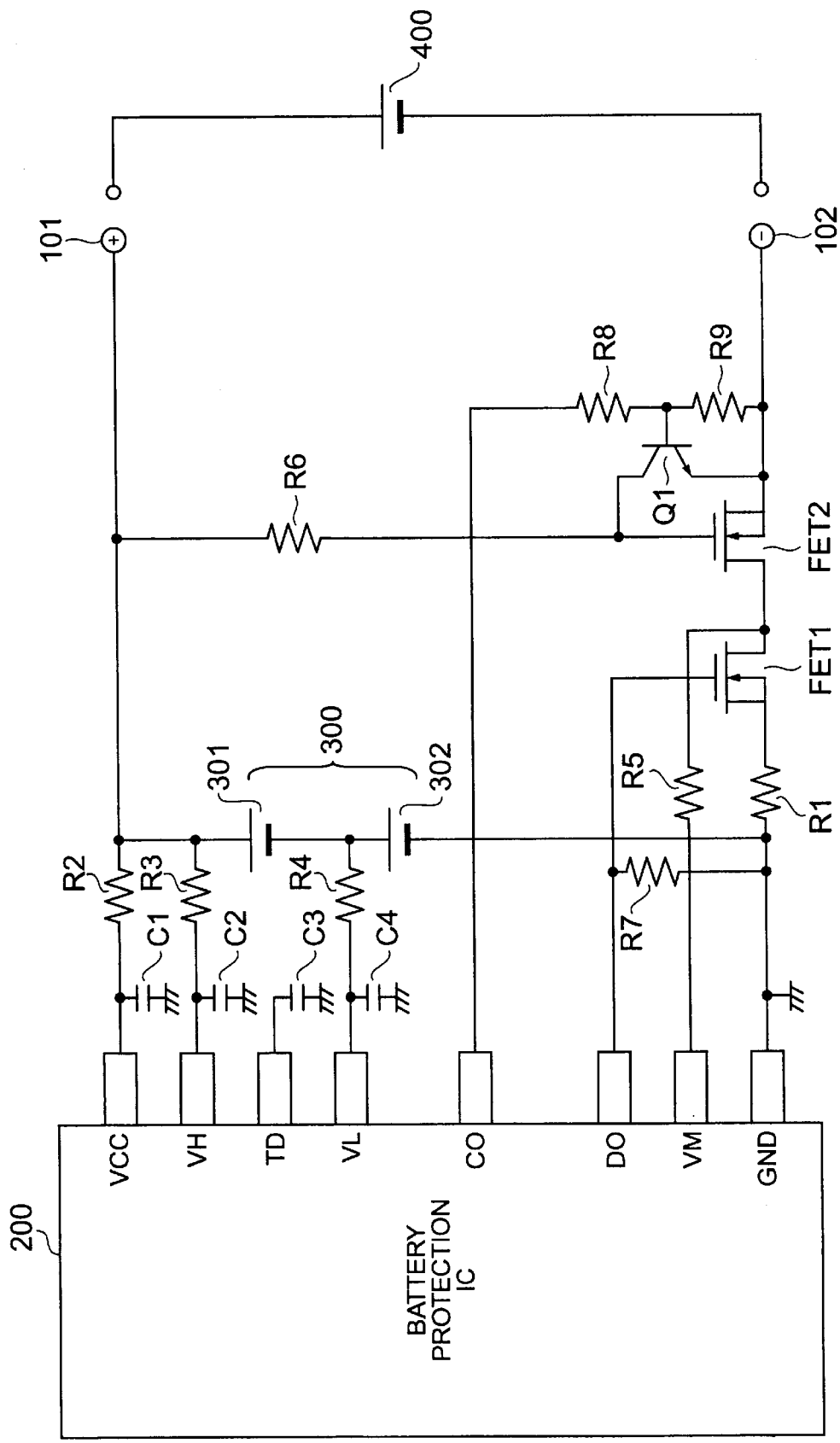
FIG. 1 is a block diagram of a conventional battery pack comprising a conventional overcharge protection circuit.
Figure 2:
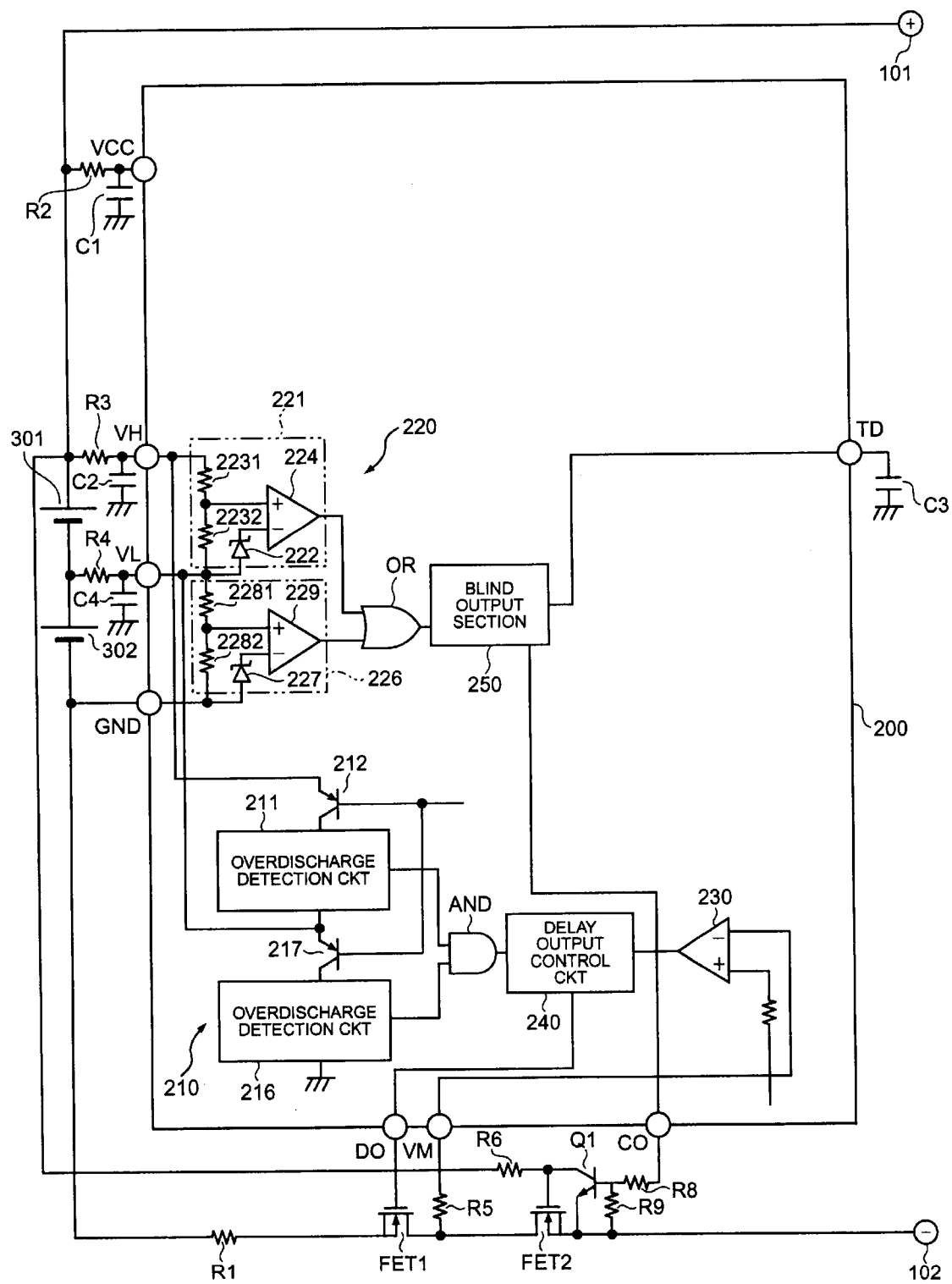
FIG. 2 is a block diagram of a battery protection IC for use in the battery pack illustrated in FIG. 1.

Referring to FIGS. 1 and 2, a conventional battery pack 100' will be described at first in order to facilitate an understanding of the present invention. FIG. 1 is a block diagram showing an external structure of the conventional battery pack 100' and a battery protection circuit (battery protection integrated circuit (IC)) included therein. FIG. 2 is a block diagram showing an internal structure of the battery protection circuit (battery protection IC) illustrated in FIG. 1.

As shown in FIG. 1, the battery pack 100' has a positive electrode terminal 101 and a negative electrode terminal 102. The positive electrode terminal 101 and the negative electrode terminal 102 are also called external connection terminals or pack output terminals in the manner which is described above. Between the positive electrode terminal 101 and the negative electrode terminal 102, a load (not shown) or a charger 400 are selectively connected.

The illustrated battery pack 100' comprises a secondary battery 300 including first and second lithium ion cells 301 and 301 (each of which is also called a unit cell). The secondary battery 300 is connected between a power source terminal and a ground terminal to generate a battery voltage Vcc. In other words, the secondary battery 300 has a cathode connected to the power source terminal and an anode connected to the ground terminal. The power source terminal is connected to the positive electrode terminal 101. The secondary battery 300 is connected in parallel with the battery protection circuit (battery protection IC) depicted at 200.

The battery protection circuit (battery protection IC) 200 has a power source input terminal VCC, a positive electrode connection terminal VH for the secondary battery 300, an overcharge detection blind time setting terminal TD, an intermediate connection terminal VL, an overcharge detection output terminal CO, a gate driving terminal DO for a first field effect transistor which will later be described, an overcurrent detection and discharge detection input terminal VM, and a ground terminal GND. Although the battery protection IC 200 actually has other terminals in addition to the above-mentioned terminals, the other terminals are omitted because they have directly no relevance to this invention.

Now, the description will be directed to schematic functions of the above-mentioned terminals. The power source input terminal VCC is supplied with the battery voltage Vcc of the secondary battery 300. The battery voltage Vcc is monitored between the positive electrode connection terminal VH and the ground terminal GND. Connected between the overcharge detection blind time setting terminal TD and the ground terminal GND, an exterior type capacitor C3 (which will later be described) enables to set an overcharge detection blind time interval. The overcharge detection output terminal CO is an open collector output of a pnp-type bipolar transistor which will later be described. The overcharge detection output terminal CO takes a logic "H" level when the battery pack 100' is put into an overcharge mode. The overcharge detection output terminal CO is put into a high-impedance state when the battery pack 100' is put into other modes. When a voltage between the overcurrent detection and discharge detection input terminal VM and the ground terminal GND is a plus voltage, the overcurrent detection and discharge detection input terminal VM equivalently monitors a discharge current. When the voltage between the overcurrent detection and discharge detection input terminal VM and the ground terminal GND is a minus voltage, the overcurrent detection and discharge detection input terminal VM detects a discharge. The gate driving terminal DO takes a logic "H" level when the battery pack 100' is put into a normal mode or the overcharge mode. The gate driving terminal DO takes a logic "L" level when the battery pack 100' is put into an overdischarge mode or an overcurrent mode. The ground terminal GND serves as a negative electrode connection terminal for the secondary battery 300.

Now, description will be directed to a peripheral circuit of the battery protection IC 200. The secondary battery 300 has a cathode connected to the positive electrode terminal 101 and an anode connected to the negative electrode terminal 102 through a resistor R1 and first and second field effect transistors FET1 and FET2 which will later be described.

The power source input terminal VCC is connected to the positive electrode terminal 101 (the cathode of the secondary battery 300) through a resistor R2 and is grounded through a capacitor C1. In a similar manner as the power source input terminal VCC, the positive electrode connection terminal VH is connected to the positive electrode terminal 101 (the cathode of the secondary battery 300) through a resistor R3 and is grounded through a capacitor C2. The overcharge detection blind time setting terminal TD is grounded through the above-mentioned exterior type capacitor C3. The intermediate connection terminal VL is connected through a resistor R4 to a connection node between the first and the second lithium ion cells 301 and 301 and is grounded through a capacitor C4.

In addition, the above-mentioned resistors and capacitors have resistance values and capacitance values, for example, as follows. The resistor R1 has a resistance value of 50 mΩ. The resistor R2 has a resistance value of 10 Ω. The resistor R3 has a resistance value of 1 kΩ. The resistor R4 has a resistance value of 1 kΩ. The capacitor C1 has a capacitance value of 0.1 μF. The capacitor C2 has a capacitance value of 1 μF. The capacitor C3 has a capacitance value of 0.1 μF. The capacitor C4 has a capacitance value of 0.1 μF.

In the manner which is described above, between the anode of the secondary battery 300 and the negative electrode terminal 102, the first and the second field effect transistors FET1 and FET2 are connected in series with each other through the resistor R1. The first field effect transistor FET1 is operable as a discharge control switch while the second field effect transistor FET2 is operable as a charge control switch. In the example being illustrated, each of the first and the second field effect transistors FET1 and FET2 consists of an n-channel metal oxide semiconductor field effect transistor (MOSFET).

The first field effect transistor FET1 has a source connected to the ground terminal GND, a gate connected to the gate driving terminal DO, and a drain connected to the overcurrent detection and discharge detection input terminal VM through a resistor R5. The second field effect transistor FET2 has a source connected to the negative electrode terminal 102, a gate connected to the positive electrode terminal 101 (the cathode of the secondary battery 300) through a resistor R6, and a drain connected to the drain of the first field effect transistor FET1. Between the gate driving terminal DO and the ground terminal GND, a resistor R7 is connected. The gate of the first field effect transistor FET1 is operable as a first control terminal of the discharge control switch. The gate of the second field effect transistor FET2 is operable as a second control terminal of the charge control switch. An arrangement of the first and the second field effect transistors FET1 and FET2 may be exchanged.

Now, the resistors R5–R7 have resistance values, for example, as follows. The resistor R5 has a resistance value of 10 kΩ. The resistor R6 has a resistance value of 1 MΩ. The resistor R7 has a resistance value of 2.2 MΩ.

On the other hand, the overcharge detection output terminal CO is connected to the negative electrode terminal 102 through a series circuit of resistors R8 and R9.

In addition, between the gate and the source of the second field effect transistor FET2, an NPN-type bipolar transistor Q1 is connected in parallel. More specifically, the NPN-type bipolar transistor Q1 has a collector connected to the gate of the second field effect transistor FET2 and an emitter connected to the source of the second field effect transistor FET2. And, the NPN-type bipolar transistor FET2 has a base connected to a connection node between the resistors R8 and R9.

In the manner which is described in the preamble of the instant specification, the secondary battery protection IC 200 has, as two main functions, the overdischarge protection function and the overcharge protection function.

Referring now to FIG. 2, the description will be made about the internal structure of the battery protection IC 200 in detailed.

The illustrated battery protection IC 200 comprises an overdischarge detection section 210 for directing the overdischarge protection function, an overcharge detection section 220 for directing the overcharge protection function, an overcurrent detection section 230 for directing the overcurrent protection function, a delay output control circuit 240, and a blind output section 250.

The overdischarge detection section 210 comprises a first overdischarge detection circuit 211 for detecting an overdischarge in the first lithium ion cell (unit cell) 301, a second overdischarge detection circuit 216 for detecting an overdischarge in the second lithium ion cell (unit cell) 302, a first PNP-type bipolar transistor 212, a second PNP-type bipolar transistor 217, and an AND gate AND.

The first overdischarge detection circuit 211 is connected to the positive electrode connection terminal VH through the first PNP-type bipolar transistor 212. The second overdischarge detection circuit 216 is connected to the intermediate connection terminal VL through the second PNP-type bipolar transistor 217. When the first overdischarge detection circuit 211 detects that the first lithium ion cell 301 is put into an overdischarge condition, the first overdischarge detection circuit 211 produces a first overdischarge detected signal which is supplied to the delay output control circuit 240 through the AND gate AND. When the second overdischarge detection circuit 216 detects that the second lithium ion cell 302 is put into an overdischarge condition, the second overdischarge detection circuit 216 produces a second overdischarge detected signal which is supplied to the delay output control circuit 240 through the AND gate AND.

More specifically, each of the first and the second overdischarge detection circuits 211 and 216 has a hysteresis characteristic. That is, when the first lithium ion cell 301 has a voltage of 2.4 volts or less, the first overdischarge detection circuit 211 produces the first overdischarge detected signal of a logic low level that is supplied to the delay output control circuit 240 through the AND gate AND. Likewise, when the second lithium ion cell 302 has a voltage of 2.4 volts or less, the second overdischarge detection circuit 216 produces the second overdischarge detected signal of a logic low level that is supplied to the delay output control circuit 240 through the AND gate AND. Responsive to the first or the second overdischarge detected signals through the AND gate AND, the delay output control circuit 240 sends, to the first field effect transistor FET1 through the gate driving terminal DO, an OFF control signal for turning the first field effect transistor FET1 off after a lapse of a predetermined delay time interval. It results in turning the first field effect transistor FET1 off to prevent the secondary battery 300 from overdischarging.

On the other hand, when the first lithium ion cell 301 has a voltage of 3.0 volts or more, the first overdicharge detection circuit 211 produces a first overdischarge protection release signal of a logic high level that is supplied to the delay circuit output control circuit 240 through the AND gate AND. Similarly, when the second lithium ion cell 302 has a voltage of 3.0 volts or more, the second overdischarge detection circuit 216 produces a second overdischarge protection release signal of a logic high level that is supplied to the delay output control circuit 240 through the AND gate AND. Responsive to both of the first and the second overdischarge protection release signals through the AND gate AND, the delay control circuit 240 sends, to the first field effect transistor FET1 through the gate driving terminal DO, an ON control signal for turning the first field effect transistor FET1 on. It results in turning the first field effect transistor FET1 on.

The overcharge detection section 220 comprises a first overcharge detection circuit 221 for detecting an overcharge in the first lithium ion cell 301, a second overcharge detection circuit 226 for detecting an overcharge in the second lithium ion cell (unit cell) 302, and an OR gate OR.

The first overcharge detection circuit 221 is connected between the positive electrode connection terminal VH and the intermediate connection terminal VH. The second overcharge detection circuit 226 is connected between the intermediate connection terminal VH and the ground terminal GND. When the first overcharge detection circuit 221 detects that the first lithium ion cell 301 is put into an overcharge condition, the first overcharge detection circuit 221 produces a first overcharge detected signal which is supplied to the blind output section 250 through the OR gate OR. When the second overcharge detection circuit 226 detects that the second lithium ion cell 302 is put into an overcharge condition, the second overcharge detection circuit 226 produces a second overcharge detected signal which is supplied to the blind output section 250 through the OR gate OR.

More specifically, the first overcharge detection circuit 221 comprises a first Zener diode 222 for generating an overcharge detection reference voltage, two bleeder resistors 2231 and 2232 which are connected in series with each other, and a first overcharge detection comparator 224. Likewise, the second overcharge detection circuit 226 comprises a second Zener diode 227 for generating the overcharge detection reference voltage, two bleeder resistors 2281 and 2282 which are connected in series with each other, and a second overcharge detection comparator 229.

When the first lithium ion cell 301 has a voltage of 4.25 volts or more, the first overcharge detection circuit 221 produces the first overcharge detected signal of a logic high level that is supplied to the blind output section 250 through the OR gate OR. Similarly, when the second lithium ion cell 302 has a voltage of 4.25 volts or more, the second overcharge detection circuit 226 produces the second overcharge detected signal of a logic high level that is supplied to the blind output section 250 through the OR gate OR.

The blind output section 250 is connected to the overcharge detection blind time setting terminal TD and the overcharge detection output terminal CO. In the manner which will later be described, an overcharge detection blind time interval is uniquely set or determined by the capacitance value of the capacitor C3 connected to the overcharge detection blind time setting terminal TD. When the capacitance value of the capacitor C3 is equal to 0.1 $\mu$F in the example being illustrated, the overcharge detection blind time interval is equal to one second.

Responsive to the first or the second overcharge detected signals through the OR gate OR, the blind output section 250 sends an OFF control signal for turning the second field effect transistor FET2 to the base of the NPN-type bipolar transistor Q1 through the overcharge detection output terminal CO and the resistor R8 after a lapse of the above-mentioned overcharge detection blind time interval. It results in turning the second field effect transistor FET2 off to prevent the secondary battery 300 from overcharging.

On the other hand, when the first lithium ion cell 301 has a voltage of 4.25 volts or less, the first overcharge detection circuit 221 produces a first overcharge protection release signal of a logic low level that is supplied to the blind output section 250 through the OR gate OR. Similarly, when the second lithium ion cell 302 has a voltage of 4.25 volts or less, the second overcharge detection circuit 226 produces a second overcharge protection release signal of a logic low level that is supplied to the blind output section 250 through the OR gate OR. Responsive to both of the first and the second overcharge protection release signals through the OR gate OR, the blind output section 250 sends an ON control signal for turning the second field effect transistor FET2 on to the base of the NPN-type bipolar transistor Q1 through the overcharge detection output terminal CO and the resistor R8 after the lapse of the above-mentioned overcharge detection blind time interval. It results in turning the second field effect transistor FET2 on.

The overcurrent detection section 230 comprises an overcurrent detection comparator. When the overcurrent detection section 230 detects that an overcurrent flows as a discharge current on discharging, the overcurrent detection section 230 produces an overcurrent detected signal which is supplied to the delay circuit output control circuit 240.

Figure 3:
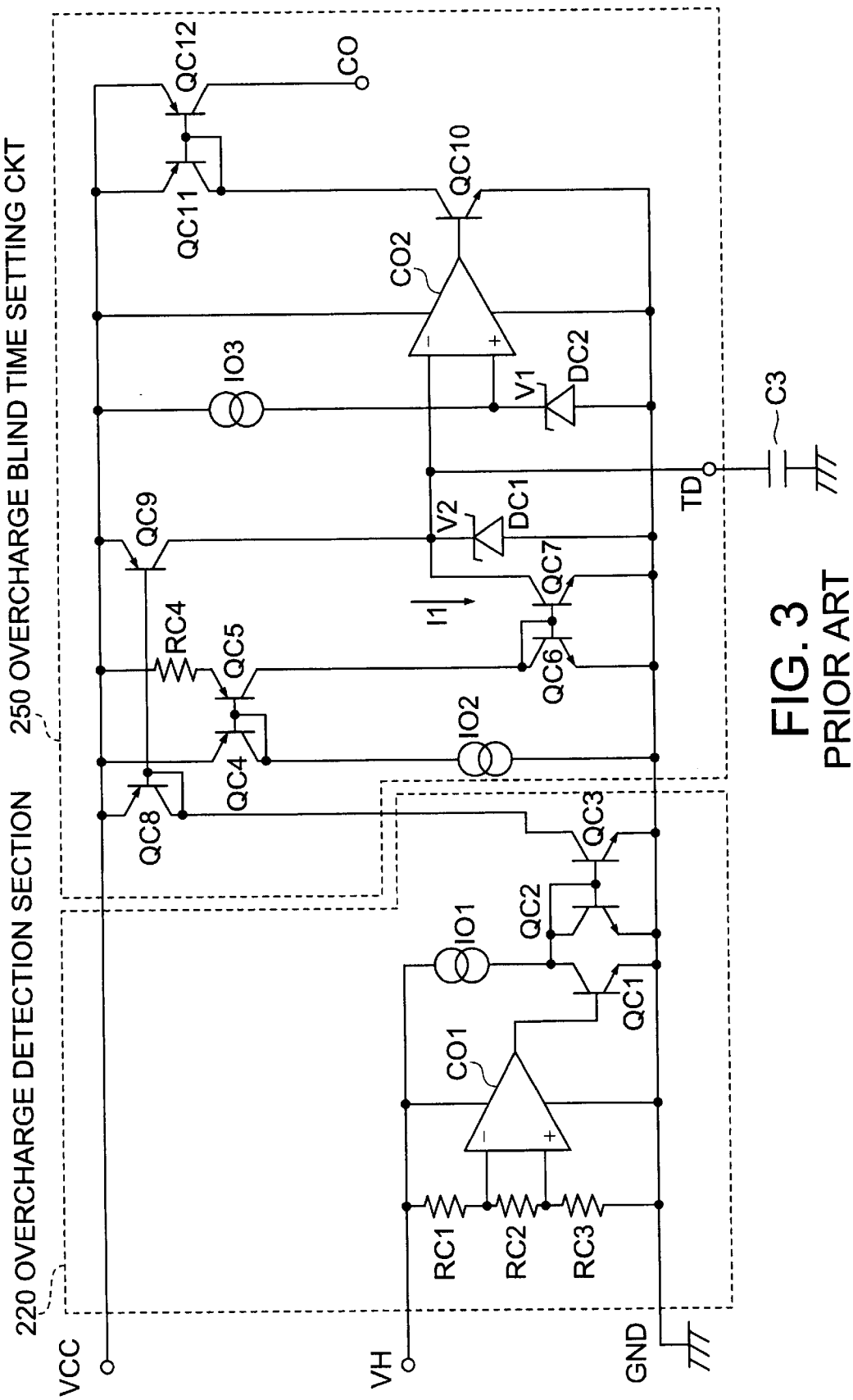
FIG. 3 is a circuit diagram of a combination of a blind output section (overcharge blind time setting circuit) and an overcharge detection section which are included in the battery protection IC illustrated in FIG. 2.

Referring now to FIG. 3, description will be directed to the blind output section 250 together with the overcharge detection section 220. However, inasmuch as FIG. 3 illustrates an example where the secondary battery 300 consists of only one lithium ion cell, it is noted that FIG. 3 is different in structure from FIGS. 1 and 2 each of which illustrates a case where the secondary battery 300 consists of two lithium ion cells. In addition, the blind section output section 250 is referred to as an overcharge blind time setting circuit. A combination of the overcharge detection section 220 and the overcharge blind time setting circuit (the blind output section) 250 is called an overcharge protection circuit.

The overcharge detection section 220 comprises resistors RC1, RC2, RC3, a comparator CO1, a constant current source 101, NPN-type bipolar transistors QC1, QC2, and QC3. The resistors RC1, RC2, and RC3 are connected in series between the positive electrode connection terminal VH and the ground terminal GND. The comparator CO1 has a positive input terminal+ connected to a connection node between the resistors RC1 and RC2 and a negative input terminal− connected to a connection node between the resistors RC2 and RC3. The comparator CO1 has an output terminal connected to a base of the NPN-type bipolar transistor QC1. The NPN-type bipolar transistor QC1 has an emitter which is grounded and a collector connected to the positive electrode connection terminal VH through the constant current source 101. The NPN-type bipolar transistor QC2 has a base and a collector both of which are connected to the positive electrode connection terminal VH through the constant current source 101, and an emitter which is grounded. The NPN-type bipolar transistor QC3 has a base connected to the base of the NPN-type bipolar transistor QC2 and an emitter which is grounded. A combination of the NPN-type bipolar transistors QC2 and QC3 constitutes a current mirror circuit.

The overcharge blind time setting circuit 250 comprises a resistor RC4, a comparator CO2, constant current sources 102,103, PNP-type bipolar transistors QC4, QC5, NPN-type bipolar transistors QC6, QC7, PNP-type bipolar transistors QC8, QC9, an NPN-type bipolar transistor QC10, and Zener diodes DC1 and DC2.

The PNP-type bipolar transistor QC4 has a base connected to a collector thereof and to a base of the PNP-type bipolar transistor QC5, the collector grounded through the constant current source 102, and an emitter connected to the power source input terminal VCC. The PNP-type bipolar transistor QC5 has an emitter connected to the power source input terminal VCC through the resistor RC4. That is, a combination of the PNP-type bipolar transistors QC4 and QC5 constitutes a current mirror circuit.

The NPN-type bipolar transistor QC6 has a base connected to a collector thereof and to a base of the NPN-type bipolar transistor QC7, the collector connected to the collector of the PNP-type bipolar transistor QC5, and an emitter which is grounded. The NPN-type bipolar transistor QC7 has an emitter which is grounded. That is, a combination of the NPN-type bipolar transistors QC6 and QC7 constitutes a current mirror circuit.

The PNP-type bipolar transistor QC8 has a base connected to a collector thereof and to a base of the PNP-type bipolar transistor QC9, the collector connected to a collector of the NPN-type bipolar transistor QC3 in the overcharge detection circuit 220, and an emitter connected to the power source input terminal VCC. The PNP-type bipolar transistor QC9 has an emitter connected to the power source input terminal VCC and a collector connected to a collector of the NPN-type bipolar transistor QC7. That is, a combination of the PNP-type bipolar transistors QC8 and QC9 constitutes a current mirror circuit.

The Zener diode DC1 is connected in parallel to the NPN-type bipolar transistor QC7. Specifically, the Zener diode DC1 has an anode grounded and a cathode connected to the collector of the NPN-type bipolar transistor QC7. In addition, the cathode of the Zener diode DC1 is connected to a negative input terminal– of the comparator CO2. The negative input terminal– of the comparator CO2 is connected to the overcharge detection blind time setting terminal TD. On the other hand, the Zener diode DC2 has an anode grounded and a cathode which is connected to a positive input terminal+ of the comparator CO2 and to the power source input terminal VCC through the constant current source 103. The comparator CO2 has an output terminal connected to a base of the NPN-type bipolar transistor QC10. The NPN-type bipolar transistor QC10 has an emitter which is grounded. The Zener diode DC2 has a first Zener voltage V1 while the Zener diode DC1 has a second Zener voltage V2 which is higher than the first Zener voltage V1.

The PNP-type bipolar transistor QC11 has a base connected to a collector thereof and to a base of the PNP-type bipolar transistor QC12, the collector connected to a collector of the NPN-type bipolar transistor QC10, and an emitter connected to the power source input terminal VCC. The PNP-type bipolar transistor QC12 has an emitter connected to the power source input terminal VCC and a collector connected to the overcharge detection output terminal CO. That is, a combination of the PNP-type bipolar transistors QC11 and QC12 constitutes a current mirror circuit.

Figure 4:
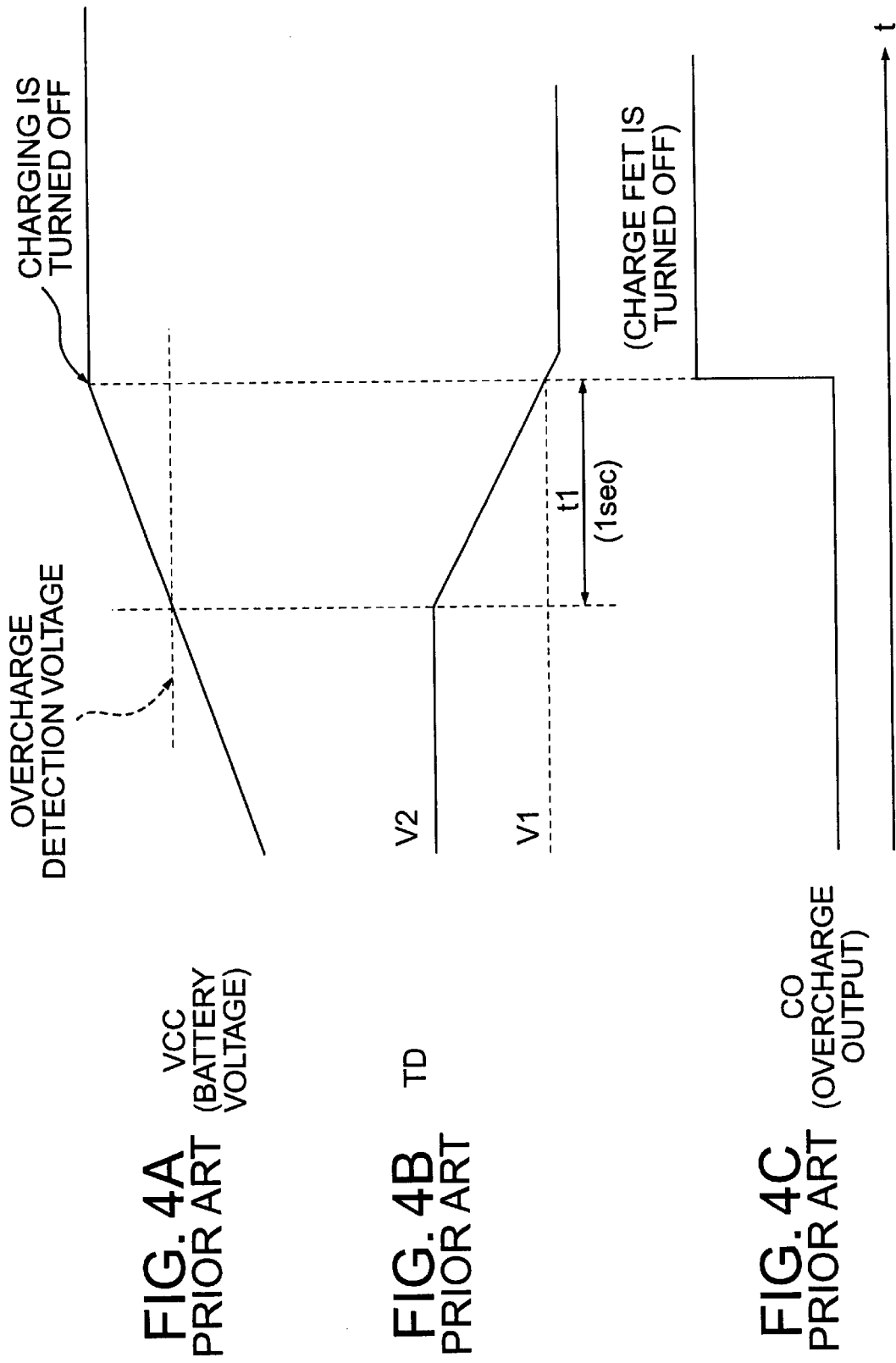
FIGS. 4A–4C are time charts for use in describing operation of the conventional overcharge protection circuit (the conventional battery pack) illustrated in FIG. 1.

Referring now to FIGS. 4A, 4B, and 4C, description will be made as regards operation of the overcharge detection section 220 and the overcharge blind time setting circuit 250 illustrated in FIG. 3. FIG. 4A is a time chart showing variations of the battery voltage Vcc. FIG. 4B is a time chart showing variations of a charged voltage in the capacitor C3. FIG. 4C is a time chart showing a waveform of a signal of the overcharge detection output terminal CO.

It will be assumed that the battery voltage Vcc is lower than the overcharge detection voltage. In this event, the overcharge detection blind time setting terminal TD is kept the second Zener voltage V2 of the Zener diode DC1. That is, the capacitor C3 is charged with the charged voltage which is equal to the second Zener voltage V2. Under the circumstances, the positive input terminal+ of the comparator CO2 is applied with the first Zener voltage V1 of the Zener diode DC2. Inasmuch as the first Zener voltage V1 is lower than the second Zener voltage V2, the comparator CO2 produces a signal of a logic low level.

While the secondary battery 300 is charged by the charger 400 (FIG. 1), the battery voltage Vcc gradually increases. When the battery voltage Vcc is equal to the overcharge detection voltage or more, the overcharge detection section 220 produces an overcharge detected signal. Responsive to the overcharge detected signal, the overcharge blind time setting circuit 250 discharges electrical charges accumulated in the capacitor C3 by a constant current 11. An overcharge detection blind time interval t1 is defined by the capacitance value of the capacitor C3. Inasmuch as the capacitor C3 is discharged, a potential in the negative input terminal– of the comparator CO2 gradually decreases. When this potential is finally lower than a potential in the positive input terminal+ of the comparator CO2 (that is, the first Zener voltage V1 of the Zener diode DC2), the comparator CO2 produces a signal of a logic high level. Accordingly, the overcharge detection output terminal CO produces the OFF control signal.

Inasmuch as the capacitance value of the capacitor C3 is equal to 0.1 $\mu$F in the example being illustrated, the overcharge detection blind time interval t1 set in the overcharge blind time setting circuit 250 is equal to one second. The reason why the overcharge detection blind time interval is set using the overcharge blind time setting circuit (the blind output section) 250 is to prevent the battery pack 100' from malfunctioning caused by disturbance noises and transient variations of a voltage.

In the manner which is described above, the conventional overcharge protection circuit monitors the battery voltage Vcc of the secondary battery 300 and prohibits charging, when the battery voltage Vcc is equal to the overcharge detection voltage or more, by turning the charge control switch (the second field effect transistor) FET1 off after a lapse of the overcharge detection blind time interval t1 set in the overcharge detection blind time setting terminal TD.

However, in a case where the charger 400 is an abnormal one so as to flow, as a charging current, an excessive current (which has a current value, for example, of ten amperes or more), problem arises in the conventional overcharge protection circuit as follows.

More specifically, in this case, the battery voltage Vcc of the secondary battery 300 becomes the overcharge detection voltage or more immediately after the secondary battery 300 is charged by the charger 400. Nevertheless, in the conventional overcharge protection circuit, the excess current continues to flow from the charger 400 to the secondary battery 300 during the overcharge detection blind time interval set in the overcharge detection blind time setting terminal TD, as shown in FIGS. 4A–4C. As a result, it is feared that the excess current causes damage to the field effect transistors FET1 and FET2 and so on during the overcharge detection blind time interval, as mentioned in the preamble of the instant specification.

Figure 5:
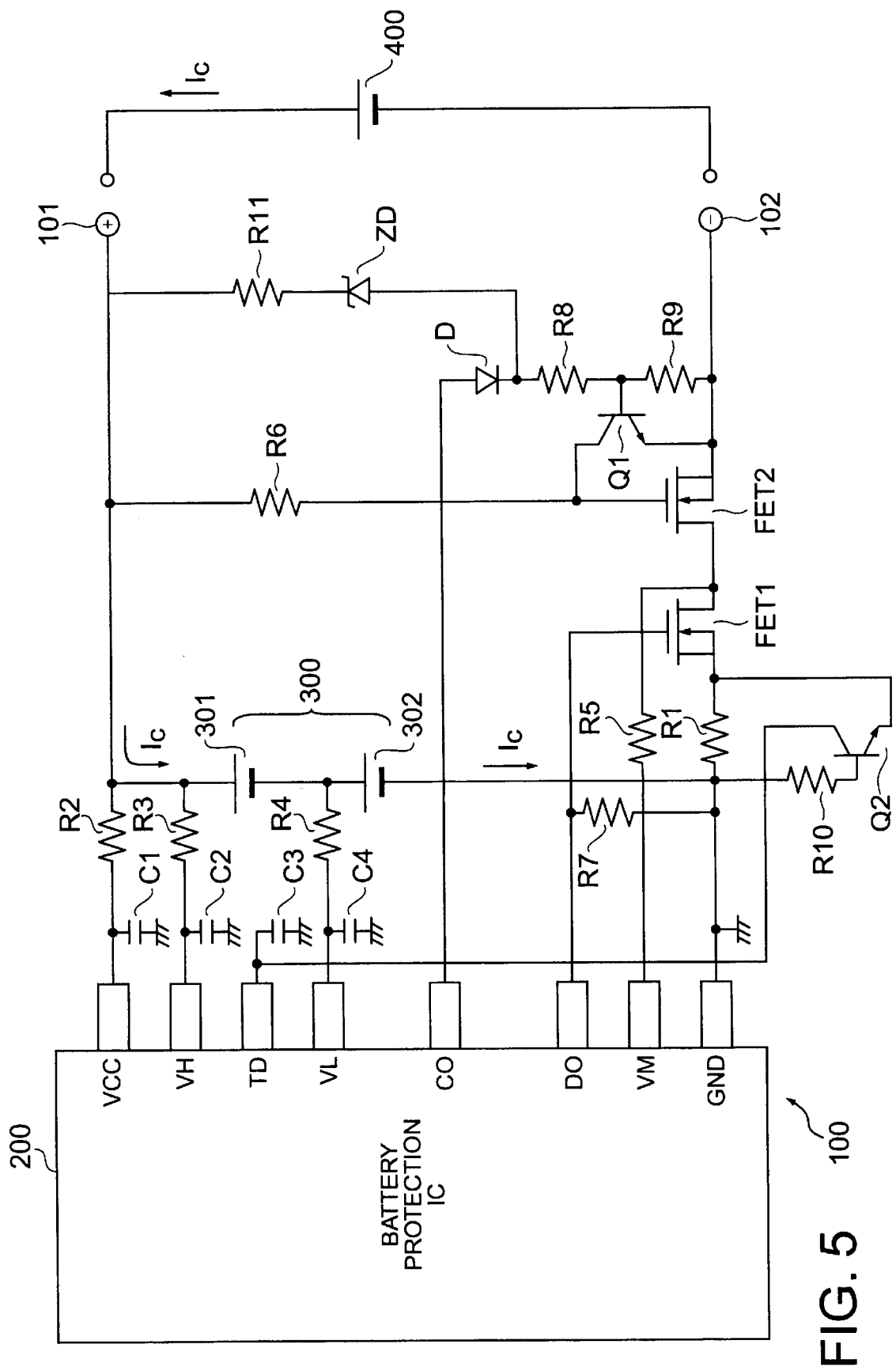
FIG. 5 is a block diagram of a battery pack comprising an overcharge protection circuit according to a first embodiment of this invention.

Referring to FIG. 5, the description will proceed to a battery pack 100 comprising an overcharge protection circuit according to an embodiment of this invention. The illustrated battery pack 100 is similar in structure and operation to the conventional battery pack 100' illustrated in FIG. 1 except that the battery pack 100 further comprises an excessive current detecting arrangement and a forcibly discharging means both of which will later be described. Therefore, the same reference symbols are attached to those having similar functions in those illustrated in FIG. 1 and description thereto is omitted for the purpose of simplification of the description.

Although the resistor R1 is connected to the ground terminal GND of the battery protection IC 200 and the source of the first field effect transistor FET1 serving as the charge control switch in the conventional battery pack 100' as well, this invention uses the resistor R1 as the excessive current detecting arrangement also. That is, the resistor R1 detects whether or not the charging current is an excessive current.

The forcibly discharging arrangement is an arrangement for immediately and forcibly discharging electrical charges accumulated in the capacitor C3 when the excessive current is detected by the excessive current detecting arrangement or the resistor R1.

In the example being illustrated, the forcibly discharging arrangement comprises a resistor R10 connected to the resistor R1 and a PNP-type bipolar transistor Q2 connected to the resistor R1 and the capacitor C3. The resistor R10 has an end connected to the ground terminal GND (or an end of the resistor R1) and another end connected to a base of the NPN-type bipolar transistor Q2. The NPN-type bipolar transistor Q2 has an emitter connected to another end of the resistor R1 (or the source of the first field effect transistor FET1) and a collector connected to an end of the capacitor C3 (or the overcharge detection blind time setting terminal TD). The resistor R10 is for restricting a base current of the NPN-type bipolar transistor Q2.

Referring now to FIGS. 6A, 6B, and 6C, description will be made as regards operation on charging of the battery pack 100 illustrated in FIG. 5. FIG. 6A is a time chart showing variations of the battery voltage Vcc. FIG. 6B is a time chart showing variations of a charged voltage in the capacitor C3. FIG. 6C is a time chart showing a waveform of a signal of the overcharge detection output terminal CO.

It will be assumed herein as follows. The resistor R1 has the resistance value of 50 mΩ. In addition, the NPN-type bipolar transistor Q2 has an interbase-emitter forward biasing voltage VF(Q2) of about 0.6 volts. Furthermore, the charger 400 is an abnormal one which flows, as a charging current Ic, an excessive current which has a current value of twelve amperes or more.

With this structure, it will be assumed that the charger 400 is connected between the external connection terminals 101 and 102 in order to charge the secondary battery 300. Under the circumstances, the battery voltage Vcc of the secondary battery 300 gradually increases and then the battery voltage Vcc exceeds the overcharge detection voltage. In this event, the overcharge detection section 220 (FIG. 4 or FIG. 5) detects that the secondary battery 300 is put into the overcharge condition to produce the overcharge detected signal. Responsive to the overcharge detected signal, the overcharge blind time setting circuit (the blind output section) 250 starts operation thereof.

On the other hand, inasmuch as the charging current Ic of the charger 400 is larger than VF(Q2)/R1, namely, $$Ic > VF(Q2)/R2,$$

the NPN-type bipolar transistor Q2 is turned on. Where R1 in the above-mentioned expression represents the resistance value of the resistor R1. As a result, the capacitor C3 connected to the overcharge detection blind time setting terminal TD immediately and forcibly discharges the electrical charged accumulated therein.

In other words, when the resistor (the excessive current detecting arrangement) R1 detects that the charging current Ic of the charger 400 is the excessive current, the forcibly discharging arrangement (R10, Q2) makes the capacitor C2 immediately and forcibly discharge the electrical charges accumulated therein.

Accordingly, when the overcharge detection section 220 detects that the battery voltage Vcc of the secondary battery 300 is not less than the overcharge detection voltage, the overcharge blind time setting circuit (the blind output section) 250 (FIGS. 2 and 3) produces the OFF control signal from the overcharge detection output terminal CO immediately (or after a lapse of a short time interval t2) without waiting a lapse of the overcharge detection blind time interval. Accordingly, it is possible to immediately prohibit charging by turning the charge control switch (the second field effect transistor) FET2. As a result, it is possible to prevent damage to the field effect transistors FET1 and FET2 and so on.

In addition, the illustrated battery pack 100 further comprises a diode D, a Zener diode ZD, and a resistor R11. The diode D is connected between the overcharge detection output terminal CO and the resistor R8. Specifically, the diode D has an anode connected to the overcharge detection output terminal CO and a cathode connected to an end of the resistor R8. The Zener diode ZD and the resistor R11 are connected between the positive electrode terminal 101 and the resistor R8. Specifically, the Zener diode ZD has an anode connected to the end of the resistor R8 (or the cathode of the diode D) and a cathode connected to an end of the resistor R11. The resistor R11 has another end connected to the positive electrode terminal 101.

The reason why the Zener diode ZD is inserted is to protect the field effect transistors FET1 and FET2 and so on when the charger 400 is one for generating an excessive voltage in the manner which will later be described.

It will be presumed that the charger 400 for generating the excessive voltage is connected between the external connection terminals 101 and 102. In this even, the Zener diode ZD detects the excessive voltage. Responsive to this detection, the NPN-type bipolar transistor Q1 is turned on. Accordingly, it is possible to immediately charging by turning the charge control switch (the second field effect transistor) FET2 without waiting a lapse of a overcurrent detection blind time interval in the battery protection IC 200. As a result, it is possible to prevent damage to the field effect transistors FET1 and FET2 and soon.

While this invention has thus far been described in conjunction with a preferred embodiment thereof, it will now be readily possible for those skilled in the art to put this invention into various other manners. For example, the excessive current detecting arrangement and the forcibly discharging arrangement according to this invention are not restricted to those illustrated in the above-mentioned embodiment and may adopt other structures. In addition, the forcibly discharging arrangement (Q2, R10) is disposed in exterior independent from the battery protection IC 200 in the above-mentioned embodiment, the forcibly discharging arrangement may be contained in the battery protection IC 200. Furthermore, an insertion position of the excessive current detecting arrangement is not restricted to that illustrated in the above-mentioned embodiment, the excessive current detecting arrangement may be inserted in any position in a charging path through which the charging current flows.

What is claimed is:

1. A secondary battery protection circuit for protecting a secondary battery by controlling, by turning a charge control switch on and off, a charging current flowing through said secondary battery from a charger, said secondary battery protection circuit comprising:

detecting means for detecting whether or not said charging current has a value of at least ten amperes; and switch off means for immediately turning said charge control switch off when the value of said charging current is detected to be at least ten amperes;

wherein said charger is connected between external connection terminals, said secondary battery is connected between a power source terminal and a ground terminal, and wherein said charge control switch comprises an n-channel field effect transistor having a drain connected to said ground terminal and a source connected to a negative electrode terminal which is one of said external connection terminals.

2. An overcharge protection circuit for protecting a secondary battery by controlling, by turning a charge control switch on and off, a charging current flowing through said secondary battery from a charger connected between a positive electrode terminal and a negative electrode terminal, said secondary battery being connected between a power source terminal and a ground terminal, said overcharge protection circuit comprising:

an overcharge detection section for detecting whether or not said secondary battery is put into an overcharge condition, said overcharge detection section producing an overcharge detected signal on detection of the overcharge condition;

an overcharge blind time setting circuit, connected to said overcharge detection section, having an overcharge detection blind time setting terminal and including a capacitor connected between the overcharge detection blind time setting terminal and the ground terminal, said overcharge blind time setting circuit producing, in response to said overcharge detected signal, an OFF control signal for turning said charge control switch off after a lapse of a predetermined overcharge detection blind time interval defined by a capacitance value of said capacitor;

excessive current detecting means for detecting whether or not said charging current is an excessive current; and forcibly discharging means, connected to said excessive current detecting means, for forcibly and immediately discharging electrical charges accumulated in said capacitor when the excessive current is detected by said excessive current detecting means, thereby immediately turning said charge control switch off upon detection of said excessive current without waiting for the lapse of said predetermined overcharge detection blind time interval.

3. An overcharge protection circuit as claimed in claim 2, wherein said excessive current detecting means comprises an excessive current detection resistor inserted in a charging path through which said charging current flows, and wherein said forcibly discharging means comprises an NPN-type bipolar transistor having a base connected to an end of said excessive current detection resistor through a base current restriction resistor, an emitter connected to another end of said excessive current detection resistor, and a collector connected to said overcharge detection blind time setting terminal.

4. An overcharge protection circuit as claimed in claim 2, wherein said excessive current has a current value of at least ten amperes.

5. An overcharge protection circuit as claimed in claim 2, wherein said charge control switch comprises an n-channel field effect transistor having a drain connected to said ground terminal and a source connected to the negative electrode terminal.

* * * * *